Dec. 15, 1959 N. W. PION 2,916,969

ROCKET LAUNCHER

Filed Jan. 19, 1956

*INVENTOR.*
NOEL W. PION

BY

*William R Lane*

ATTORNEY

United States Patent Office 2,916,969
Patented Dec. 15, 1959

2,916,969

ROCKET LAUNCHER

Noel W. Pion, Covina, Calif., assignor to
North American Aviation, Inc.

Application January 19, 1956, Serial No. 560,924

2 Claims. (Cl. 89—1.7)

The present invention is directed to a new and improved rocket launcher. More particularly, the invention concerns a parallel plate rocket launcher featured by extreme lightness and ease of manufacture.

Heretofore, armament rockets have been fired individually or in ripples from single or multiple launcher tubes. These launcher tubes have basically taken the form of banks of cylindrical open-ended tubes with and without vent holes on the periphery thereof. The present invention provides a lightweight, inexpensive, jettisonable launcher which functions to permit optimum side venting of the exhaust gases and to minimize recoil forces. The launcher is particularly adaptable for venting the tangential exhausts of spin-type rockets. The package formed by the launcher structure is such that it is, inherently, its own shipping container which can be preloaded, with rockets prior to shipment. Basically, the launcher of this invention comprises a series of spaced parallel sheets tied together by spacers and bolts and having aligned apertures adapted to hold an inserted rocket. The peripheral portions of the series of parallel sheets is further incased in a shroud to prevent impingement of exhaust gases on airframe or other structure adjacent to the mounted rocket launcher.

An object of this invention is to provide a new and improved rocket launcher.

A further object of this invention is to provide a parallel plate rocket launcher.

A still further object of this invention is to provide a lightweight rocket launcher made up of spaced, parallel, plastic sheets.

An additional object of this invention is to provide a plate-type rocket launcher particularly adapted for spin rockets.

Another object of this invention is to provide a rocket launcher having an optimum side venting construction.

Other objects of invention will become apparent from the following description taken in connection with the accompanying drawings, in which.

Figure 4:
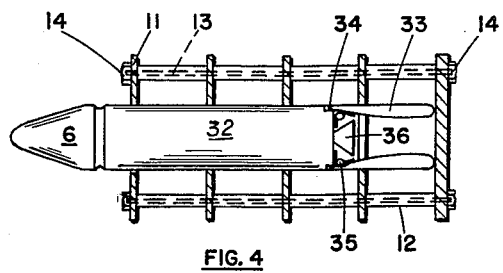

And Fig. 4 is a single rocket launcher in combination with a fin-type rocket.

Figure 1:
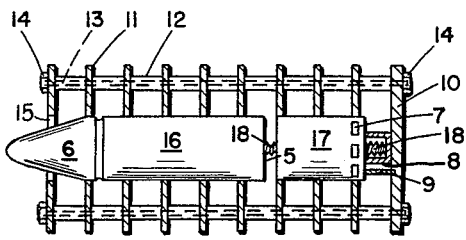
Fig. 1 is a side view of a single rocket launcher with spin-type rocket.

The rocket launcher shown in Fig. 1 comprises a base plate 10 adapted to hold a pre-spin cartridge 17 of an armament rocket 16. A series of parallel plates 11 are provided parallel to the base plate 10 and extending forwardly thereof. These plates are spaced from each other by means of cylindrical spacers 12 and the entire assemblage held in relationship by means of bolt means 13 extending from the base plate 10 to the forwardmost parallel sheet. A nut 14 or other convenient holding or clamping means is provided to hold the sheets in position. Each of the sheets are apertured as at 15 to provide an aligned, longitudinally extending, cavity of a size and shape approximately that of the maximum diameter cross section of a rocket. The rocket illustrated in Fig. 1, which, per se, forms no part of the present invention, comprises a rocket round 16 with attached warhead 6 and a pre-spin cartridge 17. An electrically operated igniter in the rocket (not shown) initiates combustion of a solid propellant in body 16, and the resultant hot gases passing aft from the exhaust portion 5 of the rocket round ignites propellant grains in the pre-spin cartridge. The combined gases exhaust through tangential nozzles 7 of the pre-spin cartridge, and the assembly is brought up to a high peripheral speed. The round and the pre-spin cartridge may be locked together by means of a threaded rod or vinculum 18, which also may be attached to the base plate 10. A spacer means 8 is normally provided to insure proper orientation of the spin cartridge. At the end of the spin acceleration period, the round 16 and cartridge 17 will have rotated a prescribed number of turns as the rocket passes off the end of the threaded vinculum. The pre-spin cartridge may or may not remain in the launcher. It is necessary that a high rate of spin be imparted to the rocket prior to its emergence from the launching tube so that it will be gyroscopically stable in flight as it enters the air stream. The launcher of this invention greatly reduces the recoil forces normally attendant rocket launching and provides for optimum side venting of the tangential exhaust gases. If it is desired that the cartridge remain in the launcher, means may be provided in the form of a continuous circumferential groove enabling free wheeling of the pre-spin cartridge after a prescribed number of turns. In Fig. 1, plates 11 are square.

Figure 2:
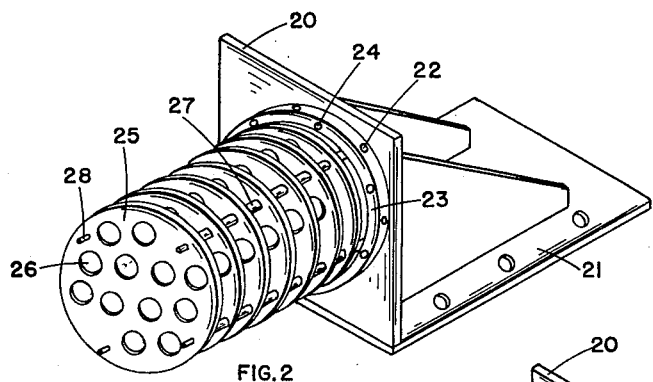
Fig. 2 is a perspective view of a mounted multiple launcher.

Fig. 2 shows a multiple launcher modification of this invention in which a series of circular or other shaped plates 25 are spaced from each other by spacing means 27 and held in assembled relationship by means 28 fastened to a base plate 20. Each of the plates 25 contain a predetermined number of rocket holding apertures 26 in aligned position longitudinally of the series of plates. The rocket and cartridge combination is thus supported by the lower peripheral edge portions of each of the apertures. A support 21 is attached to a base plate 20 for mounting the launcher in an airframe or other type structure. A shroud mounting ring 23 is attached by means 24 to the base plate 20. The mounting ring 23 has tapped apertures 22 for the reception of shroud holding bolt means. Electrical connections are normally made through the base plate 20 for firing a single rocket, all the rockets, or various combinations of the rockets. Due to the optimum dissipation of the exhaust gases, the launching of one or more rockets does not in any way affect the adjacent rockets in the launcher.

Figure 3:
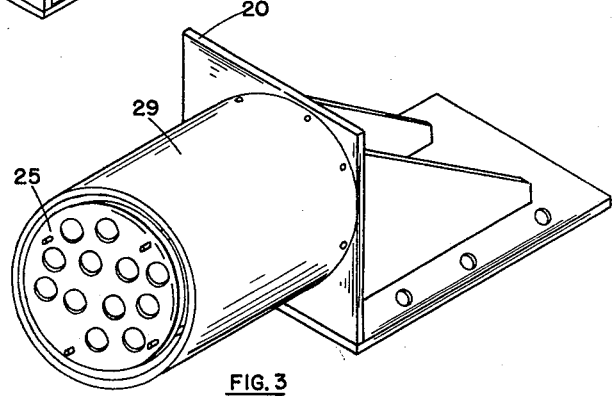
Fig. 3 is a perspective view of the completed launcher, including a shroud means.

Fig. 3 shows the completed launcher of Fig. 2, including a shroud means 29, which is spaced from and surrounds the peripheral edge portions of the spaced sheets. The shroud spacing is based on the actual gas volume produced by the firing of multiple rounds. The aft end of the shroud portion is attached to the launcher assembly by means of the aforesaid shroud bolts and tapped apertures 22 in the mounting ring 23.

Fig. 1 also shows a means, typically in the form of a plastic or metal shear pin 9, for preventing rotation of the rocket and cartridge during shipping and handling. The pre-spin cartridge 17 has an indentation on the rear surface thereof into which the pin 9 fits. The opposite end of the pin 9 is held by a corresponding indentation on the front face of the base plate 10. Once the cartridge and round start rotating due to the tangential expulsion of gases, the shear pin breaks, allowing free spinning of the round and cartridge. It is to be understood that various forms of rotation preventing devices may be employed.

Fig. 4 shows the rocket launcher of this invention used in combination with a conventional fin-type rocket. Bolt means 13 and spacers 12 hold a series of parallel plates 11 in assembled condition. A rocket 32, having fins 33 extending rearwardly thereof, sits on the lower peripheral portion of aligned apertures in the plates 11. When the rocket 32 is fired, exhaust gases are emitted from nozzle 36 and are dissipated through the longitudinally extending apertures as well as through the spaces between the spaced plates. When the aft edge of the fins 33 pass from the launcher, spring means 35 rotates the fins 33 about the pivot point 34 to place the fins in operating position. The apertured parallel plates of the launcher of this invention serve thus to guide the rocket on its initial thrust forward as well as to provide for optimum dissipation of the exhaust gases.

Lightweight rocket launchers have been made employing various phenolic resin plastic sheets. Phenolic resins containing fiber glass or asbestos-type binders have been found to be advantageous. Alternately, the sheets may be of hard-coated aluminum made by a standard anodizing process. Due to the rapid dissipation of the exhaust gases, it has been found that these relatively low melting materials, i.e., aluminum and plastics, are suitable for launching operations. The actual spacing of the plates, as well as the thickness thereof, is dependent upon the particular design criteria of the rocket being launched and the size of the installation. For example, a typical launcher for a small 1.5 inch diameter, seven inch rocket includes eight spaced plates of 1/16 inch thick phenolic-based plastic extending forwardly from a 1/8 inch aluminum base plate. These plates are shrouded with a 12 inch diameter cylinder of 0.037 inch thick aluminum sheet with a 5/8 inch spacing between the peripheral edge portions of the plastic sheets and the shrouding.

Although this invention has been described and illustrated in detail, it is to be clearly understood that the same is by way of illustration and example only and is not to be taken by way of limitation, the spirit and scope of this invention being limited only by the terms of the appended claims.

I claim:

1. A jettisonable rocket launching pod comprising a demountable airframe attaching means, a series of parallel plastic sheets extending from said means, each of said sheets having circular rocket-holding apertures aligned with corresponding apertures of similar diameter in the entire series of sheets, means spacing each of said sheets from the others in said series, means holding said sheets in assembled relationship and shroud means annularly spaced from and enclosing the peripheral edge portions of said series of sheets.

2. A rocket launching pod comprising a demountable airframe attaching means, a series of parallel light-weight sheets extending from said means, each of said sheets having circular rocket-holding apertures aligned with corresponding apertures of similar diameter in the entire series of sheets, edge portions of said apertures being adapted to support an inserted rocket in firing position, means spacing each of said sheets from the others in said series to allow side venting throughout a rocket launching phase, means holding said sheets in assembled relationship and shroud means annually spaced from and enclosing the peripheral edge portions of said series of sheets.

References Cited in the file of this patent

UNITED STATES PATENTS

| | | |
|---|---|---|
| 533,572 | Unge | Feb. 5, 1895 |
| 1,380,358 | Cooke | June 7, 1921 |
| 1,434,044 | Cooke | Oct. 31, 1922 |
| 2,398,871 | Turnbull et al. | Apr. 23, 1946 |
| 2,549,778 | Crawley | Apr. 24, 1951 |
| 2,564,695 | Johnson et al. | Aug. 21, 1951 |
| 2,609,730 | Bergstron | Sept. 9, 1952 |
| 2,792,758 | Bach et al. | May 21, 1957 |

FOREIGN PATENTS

| | | |
|---|---|---|
| 912,398 | France | Apr. 29, 1946 |
| 457,201 | Italy | May 12, 1950 |